United States Patent
Lambert et al.

(10) Patent No.: US 6,505,181 B1
(45) Date of Patent: *Jan. 7, 2003

(54) RECOGNITION SYSTEM

(75) Inventors: Robert Bartholemew Lambert, Renfrewshire; Richard John Fryer, Torrance; William Paul Cockshott, Glasgow, all of (GB)

(73) Assignee: University of Strathclyde, Glasgow (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 18 days.

(21) Appl. No.: 08/951,239

(22) Filed: Oct. 16, 1997

Related U.S. Application Data

(63) Continuation of application No. 08/535,078, filed as application No. PCT/GB94/00777 on Apr. 13, 1994, now abandoned.

(30) Foreign Application Priority Data

Apr. 13, 1993 (GB) .............................................. 9307611

(51) Int. Cl.$^7$ .............................................. G06F 75/18
(52) U.S. Cl. ...................................................... 706/20
(58) Field of Search ..................... 395/23, 21; 706/20, 706/25, 15, 16

(56) References Cited

U.S. PATENT DOCUMENTS 5,265,224 A * 11/1993 Maruno ....................... 395/24
5,517,597 A * 5/1996 Aparicio, IV et al. ......... 395/24

OTHER PUBLICATIONS

Ahalt et al. "Competitive Learning Algorithms for Vector Quantization." Neural Networks. vol. 3 pp. 277–290, 1990.*
Refai et al. "Image Transmission Based on Neural network Approaches." GLOBECOM '92: IEEE Global Telecommunications Conference. pp. 1315–1318, 1992.*
Kong et al. "Differential Competitive Learning for Centroid Estimation and Phoneme Recognition." IEEE Transactions on Neural Networks. vol. 2 No. 1 pp. 118–124, Jan. 1991.*

(List continued on next page.)

*Primary Examiner*—Mark R. Powell
(74) *Attorney, Agent, or Firm*—Alston & Bird LLP

(57) ABSTRACT

A recognition system of the self-organizing artificial neural network type is arranged to classify input data according to stored categories which have been determined by a training process. In the training process the initial category representations are selectively iteratively updated in response to a series of training patterns and in accordance with a competitive learning routine. this routine uses measures of category utilization based on the proportion of all inputs received over a representative period, particularly long term utilisation and short term utilization, to ensure that all available categories will be used and that the system is stable. The training rate which determines the amount of modification to a category representation at an up-date is local to each category and is based upon the maturity of the category and on the similarity measure between the internal representative pattern and the training input so that the training duration can be minimized. A user-operated selectively-operable suggestion learning input is provided to each category to modify the training process or to enable secondary training to proceed during classification of input data using that input data as the training patterns. The categories are represented by multiple reference patterns with respective importance values from which the degree of compatibility between an input and a category is computed taking into account the importance values.

9 Claims, 10 Drawing Sheets

OTHER PUBLICATIONS

Krishnamurthy et al. "Neural Networks for Vector Quantization of Speech and Images." IEEE Journal on Selected Areas in Communications. vol. 8 No. 8 pp. 1449–1457, Oct. 1990.*

IEEE Transactions On Neural Networks, Differential Competitive Leaning for Centroid Estimation and Phoneme Recognition, vol. 2, No. 1, Jan. 1991, New York US pp. 118–124, Kong and Kosko.

IEEE International Conference On Neural Networks, "An Extended Self–Organizing Map With Gated Neurons", vol. 3, Mar. 28, 1993, San Francisco, USA pp. 1474–1479.

IEEE First International Conference On Neural Networks, "Learning By Interaction With Environment", vol. 2, Jun. 21, 1987, San Diego, USA pp. 531–540.

Neural Networks, vol. 3, No. 3, 1990, Oxford GB, pp. 277–290 "Competitive Learning Algorithms For Vector Quantization", Ahalt, et al.

IEEE Transactions On Neural Networks, vol. 3, No. 2, Mar. 1992, New York US pp. 167–175, Competitive Learning With Generalized Winner–Take–All Activation, Lemmon et al.

* cited by examiner

RECOGNITION SYSTEM

This application is a continuation of application Ser. No. 08/535,078, filed Apr. 8, 1996 abandoned, which is the national stage of International Application No. PCT/GB94/00777, filed Apr. 13, 1994.

FIELD OF THE INVENTION

The present invention relates to a recognition system for pattern recognition and classification and is particularly, though not necessarily, concerned with a self- organising artificial neural network capable of unsupervised learning.

DESCRIPTION OF PRIOR ART

A neural network is a network of interconnected processing elements in which information is stored by setting different interconnection strengths or weights. Each element of the network provides an output which is a function of its weighted inputs and the network learns categories for example by adjusting the interconnection weights in response to a series of training patterns. It is known to make use of such artificial neural networks which have been trained to classify input data according to the stored categories which have been determined by the training.

One particular training arrangement is known as competitive learning. On presentation of each input pattern of a training set each existing category competes to represent that input. The one or more categories that best represent the input by virtue of being most similar to the input are identified and then modified such that the input is better represented by those modified categories [Rosenblatt, F. (1962) "Principles of Neurodynamics" New York: Spartan]. The amount of modification is known as the training rate.

A problem with this approach is that the categories identified at the end of the training are dependent on the initial internal representations of each potential category. Poor selection of the initial internal representations results during subsequent use of the system in some categories (which will correspond to physical or effective resources within the system) being over- or under-used and possibly not used at all. Several techniques have been proposed to circumvent this problem, in each case with an associated cost:

(i) The initial category representations are pre-set with 'representative examples' of the training data. This ensures that the categories defined are in the appropriate user domain, but requires detailed knowledge on the part of the system user of the range and distribution of data within the domain. The technique assumes that the data is available prior to training. Neither the requirement nor the assumption is realistic for many real problems of interest.

(ii) An alternative approach [Rumelhart, D. E. and Zipser, D. (1985) "Feature Discovery by Competitive Learning" Cognitive Science 9 pp. 75–112] involves the updating of all category representations following the presentation of each training data input. Each category representation is updated according to its win/lose state such that the loser or losers of a pattern presented to the network have their category representations modified using a fraction of the training rate used to modify the winning category or categories. This technique has the advantage that all categories will be utilised. However, to prevent instability and associated loss of learning, the rate at which categories are modified must be kept very low. This results in very long training times which are unacceptable for many practical applications.

(iii) The competitive units may be arranged such that a topological mapping exists between categories [Kohonen, T. (1989) "Self Organisation and Associative Memory [3rd edition]" Berlin: Springer-Verlag]. Groups of categories are then modified on presentation of each training input.

Typically a winning category will have a radius of influence determining the group of categories to be updated. This radius of influence decreases as training progresses. The rate at which the radius of influence should decrease is problem dependent and long training times are required.

(iv) As an alternative to separate initialisation of each category, systems have been reported [Hecht-Nielsen, R. (1987) "Counterpropagation Networks" Applied Optics 26 pp.4979–4984] which initialise each category representation to the same representative pattern V. As training proceeds each input pattern denoted X on which training is based is modified to take the form $[\alpha.X+(1-\alpha).V]$ where $\alpha$ is a control parameter which is zero initially but which tends to 1 as training proceeds. This technique is claimed to allow the category representations to adjust to cover the complete range of input patterns. However, the adjustment is data dependent (both in data distribution and in order of presentation) and is also slow. The use of all available categories is not guaranteed.

(v) Investigations have been carried out [De Sieno, (1988) "Adding a Conscience to Competitive Learning" Proc. IEEE Int.Conf. on Neural Networks San Diego, I pp.117–124] into the use of a bias term to implement dynamic thresholds for each category such that under-utilised categories may learn more easily. However the bias is difficult to control and instability usually results. As a consequence the training rate must be kept low and long training times are unavoidable. Additionally the rate at which the bias must be varied is highly data dependent making practical implementations difficult.

(vi) Noise can be added to the input patterns, decreasing in magnitude as training proceeds. It is further possible [G.J. Hueter (1988) "Solution to the Travelling Salesman Problem with an Adaptive Ring" Proc.IEEE Int.Conf.on Neural Networks San Diego, I pp.85–92] to structure the noise so that all categories will be used during training. To achieve a reasonable distribution of categories the training rate must be kept very small and long training times are required.

Another known problem is that there are two conflicting requirements during training: namely plasticity (the ability to learn new patterns) and stability (the ability to retain responses to previously learnt patterns). This gives rise to what has been described as the Stability-Plasticity dilemma. If the training rate is high, allowing large modifications in the categories formed, then new patterns will rapidly be learnt but at the expense of previously formed categories; i.e the system will be unstable. With a very low training rate, whilst the categories are stable with consistent responses to similar data, it is necessary to present a new pattern many times before the system adapts to recognise it. It is general practice to arrange for the training rate to be high in the early stages of training and to have it tend towards zero as training proceeds, so guaranteeing stability. In order to achieve the desired combination of appropriately categorised data with stability the training data must be carefully ordered so that the evolution of categories proceeds in an orderly fashion.

To deal with the Stability-Plasticity dilemma 'Memory-Based Learning' has been proposed as an addition to competitive learning and entails the explicit storage of training patterns to form new categories (whilst also maintaining established categories). A popular version of this approach is Adaptive Resonance Theory (ART) [Carpenter, G.A. and Grossberg, S. (1987) "A Memory Parallel Architecture for a Self-Organising Neural Pattern Recognition Machine" Computer Vision, Graphics and Image Processing, 37 pp. 54–115]. ART assumes the existence of an unlimited number of available categories, each initially empty. The first pattern presented is stored explicitly as the representation for the first category. Subsequent training patterns generate measures of similarity with the category or categories already formed and if sufficiently similar to one of the existing categories will be used to modify that category. If not sufficiently similar to an existing category the training pattern is used to initialise a new category. To ensure stability a category once formed may only slowly be modified. Whilst training is fast and stable under this regime it is for the user to determine the criteria which decide whether new categories should be established, a decision which is not always obvious even with a good understanding of the application domain. Furthermore, the approach is susceptible to noise, is not guaranteed to well represent the training set and makes prediction of the functionality of the final system problematic since the final number of categories is not known.

A group of competitive units employing competitive learning may be arranged so that each unit receives the same input and each unit competes with all others to categorize the same data. Such a group is defined as a competitive neighbourhood. Any number of competitive neighbourhoods may be combined into a single layer where each neighbourhood may receive the same, overlapping or different input patterns but cannot receive as an input the output of any competitive unit within the layer.

For many simple applications a single layer of competitive units is sufficient. In such simple cases, the problems of the need for knowledge of potential categories, of instability and of long training times can be overcome. However there is a limit to the information that a single layer can handle and as the size and complexity of categorization tasks increases, so additional layers are required. In multi-layer systems each layer may receive as an input the output from another layer. As most competitive neighbourhoods receive inputs not from the outside world but rather from other competitive neighbourhoods from other layers, it is not practical for a user to pre-set category representations for these layers as good categorizations are extremely difficult to determine.

Stability is critical when training a multi-layered network. If categorizations within the initial layers constantly change, higher layers of the network will not have consistent inputs on which to base categorization. Without careful selection of the training rate and/or achievement of stability within each layer, the information conveyed will be of little value. Yet during training a network must be capable of learning and responding to pattern classes presented independently of their order of presentation, i.e. to deal with the stability-plasticity dilemma. For multi-layered training, the ART approach to stability cannot be practical as the number of categories formed is dynamic.

In practice multi-layer competitive networks are implemented and trained a layer at a time. Such networks require very careful design and significant effort on the part of the designer in determining suitable data with which to train each layer. Once each layer has been trained, further training is not possible as it will invalidate the inputs to subsequent layers, preventing further training to improve performance and/or learn new classes.

SUMMARY OF THE INVENTION

It is an object of the present invention to provide a recognition system in which, independently of an input data set, a competitive learning process categorizes the input data such that the distribution of that data is reflected by the categories formed with each category equally utilized so that the information stored by the network is maximized.

According to a first aspect of the present invention there is provided a system for classifying data vectors into at least one of a plurality of categories respectively defined by stored vector representations which have been determined by a training process, the system comprising a plurality of interconnected processing elements which, for implementing the training process, include:

Input means for receiving input training vectors;

Storage means for storing vector representations of the categories;

Calculating means for calculating a measure of similarity between an input vector and the stored representations for each category; and Means for selecting and then modifying the selected stored vector representations so as to re-define the categories on an iterative basis during the training process;

wherein the selecting and modifying means comprises for the processing elements of each category:

means for recording a plurality of different measures of learning for the category relative to the input vectors which have been received;

means for combining said recorded measures of learning to form an activation value for the category;

means for evaluating a category strength value from said activation value and the respective measure of similarity; and means for receiving the category strength values from the processing elements of other categories in the system and deciding, based upon comparative category strengths, whether or not the recipient category representation should be modified.

According to a second aspect of the present invention there is provided a process for training a classification system wherein each of the input vectors in a sequence of input training vectors is classified into at least one of a plurality of categories, respectively defined by stored vector representations, by comparing each input vector with the plurality of stored vector representations and selectively re-defining the categories by modifying at least some of the stored vector representations after the comparison and prior to comparison of the next input vector in the sequence, wherein in order to effect said modification of stored vector representation, the system (a) records a plurality of different measures of learning for each category relating to the input vectors which have been received;

(b) quantifies the similarity in the current comparison for each category;

(c) combines the measures from steps (a) and (b) into a strength factor for each category;

(d) correlates and compares the numerous strength factors for all the categories;

(e) identifies those categories having a strength factor which fall into a pre-determined class; and (f) modifies the categories identified by step (e).

By virtue of the present invention the general competitive training rule is modified such that the modification of categories is influenced both by category usage and by the similarity between internal representative patterns and network training inputs. More particularly, use is made of a plurality of measures of category utilization in the training process, based on the proportion of all inputs received over a representative period which are used to modify that category. Typically two utilization measures are used which respectively monitor long and short term category learning. The long term measure records how frequently the category has previously had its stored vector representation modified whereas the short term measure records how recently the category has had its stored vector representation modified. The short term measure preferably augments non-linearly with each unused input vector. The long term utilization criterion, herein referred to as "maturity", ensures that all available categories will be used during training. The short term utilization criterion, herein referred to as "potential", improves stability by ensuring that the product combination of maturity and potential, herein referred to as "activation", never dominates "similarity" in category modification.

The predetermined class of category strengths which is used to select the categories to be modified may for example be formed by all those categories whose strengths are above the mean or average strength value, or may be formed by the single category of greatest strength value, or may be formed by any arbitrary number, e.g. 5, of categories having greatest strength values.

In the prior art systems the amount by which categories may be modified is determined by a training rate which is global to all categories so that the rate at which categories form an ideal representation varies according to the distribution of the input data, the order in which it is presented, and the initial representations within each category. To ensure stability the prior art keeps the global training rate low; hence if large changes in a category representation are required, training time will be long. To overcome this problem, the global training rate may be replaced in accordance with a preferred feature of the present invention by a training rate local to each category where the value of this local training rate is based both on the maturity of that category and on the similarities between the internal representative patterns and training inputs. An under-utilized category or a category learning inputs that have a low similarity to its internal representation (as is common at the start of training) will have a high local training rate and can rapidly modify its internal representation. A well-utilized category or a category learning patterns that have a high similarity to its internal representation can have a very low local training rate so ensuring stability.

By virtue of using a local training rate in combination with a plurality of measures of category utilization it becomes possible to undertake augmentative retraining of the system without the need to repeat the previous training process. Thus only the additional training vectors require to be presented to the system in the secondary training process.

Within a multi-layered network, stability of categories used to generate inputs for other layers is critical if layers are to learn simultaneously. However plasticity must be maintained to ensure the reassignment of categories as the need arises. A further preferred feature of the present invention is to introduce a "suggestive learning" input to each category. In one mode of operation this suggestive learning input is selectively operable on important categories and stabilizes formation of these categories by influencing both training and activation. In another mode of operation the suggestive learning input guides the formation of new categories such that a user can suggest potential output categories that are desirable. Such guiding signals can propagate down through the layers of an appropriately implemented network to encourage recognition of desired classes of data. Further, the suggestive learning inputs can be used to identify and suppress unimportant categories, leaving them free to categorize new sets of patterns as they arise. The suggestive learning inputs can also be used to enable secondary training to proceed during classification of input data using that data as the training patterns.

A further preferred feature of the present invention, to improve resistance to noise and to further improve category stability utilising local training rates, is that each category may be represented by multiple reference patterns. Each such reference pattern has attached to it an importance value corresponding to the degree to which it can be regarded as typical of the category. When determining the match between a category and an input, the importance value of each stored reference pattern is taken into consideration. The computed degree of compatibility between an input and a particular category will then be a function of the similarity between the input and each internal reference pattern, adjusted in each case to take account of the importance value of the pattern.

A consequence of the use of multiple reference patterns is that infrequent or currently non-typical inputs can be used to modify only internal reference patterns of low importance value, with little effect on the overall category response. If however such inputs continue to modify an internal reference pattern of low importance value, for instance by becoming more frequent, then the importance value of the internal reference pattern will rise, possibly allowing it ultimately to dominate the overall category. All of the multiple reference patterns may have the same local training rate for that category but it is preferred to allow each internal reference pattern to have a local training rate based both on its own importance value and on the maturity of the category as a whole. Thus a high importance value internal reference pattern may be made resistant to modification, keeping the category stable, though during training the importance values of internal reference patterns may shift such that there are always low importance value reference patterns that can respond to inputs that do not match the existing category.

It will be apparent that the inputs and the internal representations may be in either analogue or digital form, presented either serially or in parallel. Input data may represent, for example, samples of the intensity, or other properties, of audio sequences, measures of intensity, colour, or other properties of a video image, or signals generated by an industrial control process.

Embodiments of the present invention will be described which either overcome or obviate the disadvantages inherent in prior art pattern recognition systems of the neural network type. In particular, classification categories may be learnt rapidly and with only a relatively small training set. Further embodiments are also capable of stably retaining previously learnt categories which are known to be of value to a user whilst remaining sufficiently plastic to learn new categories. For ease of understanding the embodiments are based on two distinct processing elements herein referred to as the master and slave components. Each category within a neighbourhood is represented by a master-slave pair. The master, by using activation, is responsible for category identification and for initiating training. The slave is responsible for the storage and modification of internal reference patterns. The master-slave pair form part of an artificial neural network.

For a better understanding of the present invention and in order to show how the same may be carried into effect, reference will now be made by way of example to the accompanying drawings in which:

DESCRIPTION OF THE PREFERRED EMBODIMENTS

Figure 1:
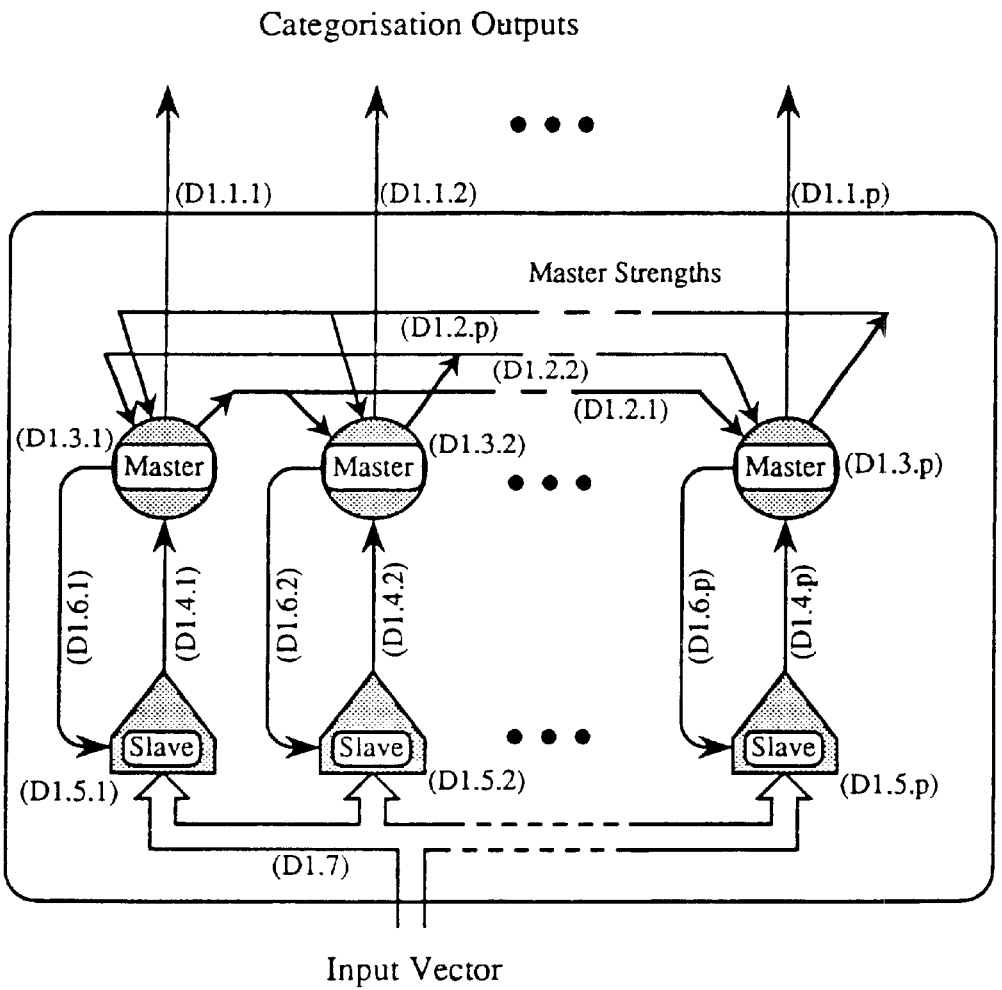
FIG. 1 shows schematically a single competitive neighbourhood, where each category is implemented by a master and slave component.

The recognition or classification system of the present invention, shown diagrammatically in FIG. 1, has a plurality of master-slave pairs, each being a potential category. On presentation of an input to the neighbourhood (D1.7), each slave (D1.5.1 to D1.5.p) determines a slave strength that is the similarity between the said input and its stored pattern. Each master (D1.3.1 to D1.3.p) receives an input (D1.4.1 to D1.4.p) from its respective slave (D1.5.1 to D1.5.p) where the said input corresponds to its slave's strength. In combination with the masters activation (determined by its maturity and potential), each master determines a master strength. This master strength is communicated to all other masters within the neighbourhood via lines (D1.2.1 to D1.2.p) such that each master can determine its category output (D1.1.1 to D1.1.p) and slave training signal (D1.6.1 to D1.6.p).

Figure 2:
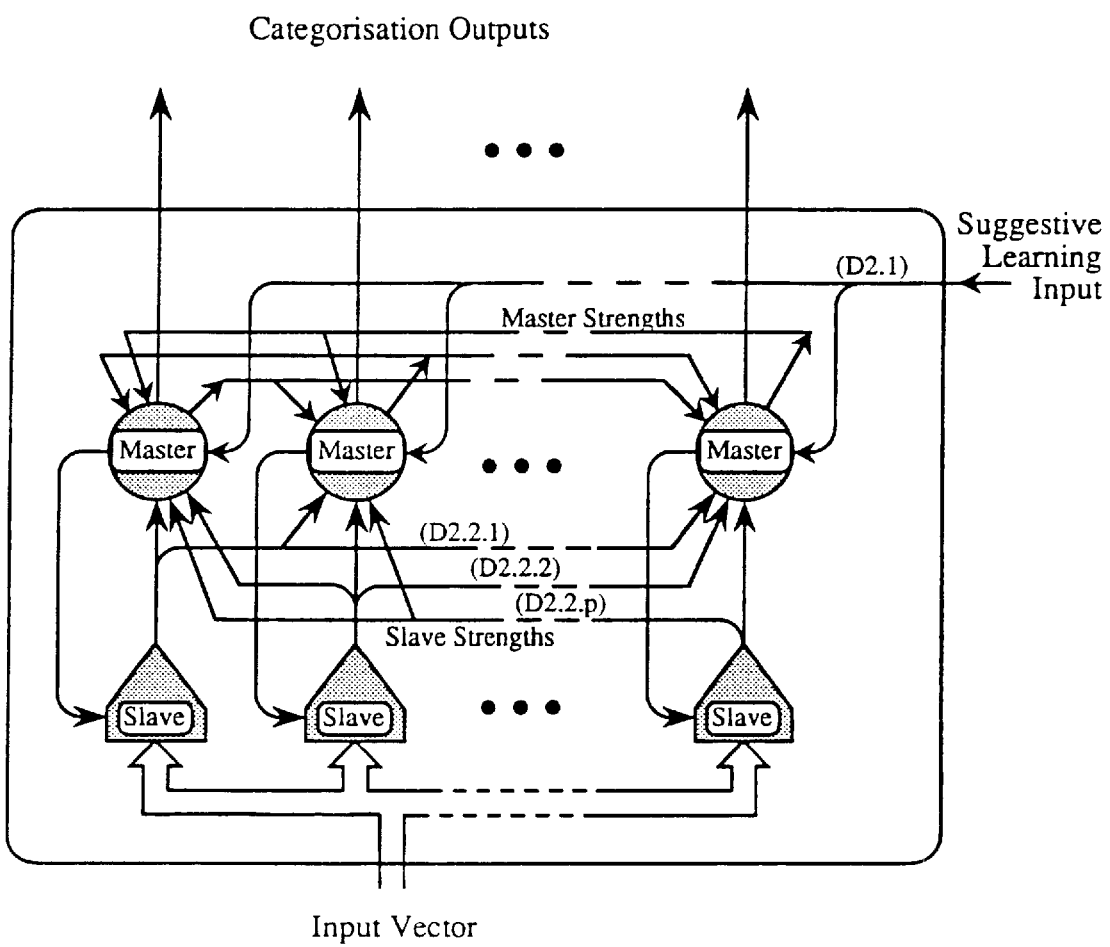
FIG. 2 is a modified version of FIG. 1 which shows a preferred implementation in which each master has a suggestive learning input and a topological connectivity is used.

In FIG. 2, each master is provided with a suggestive learning input (D2.1) to stabilize and/or guide learning. A further feature, to reduce category drift and convey information on the relationship between categories, is to make use of topological connections between master-slave pairs. Thus each master receives inputs from all slaves within the neighbourhood (D2.2.1 to D2.2.p).

FIGS. 1 to 10 illustrate examples of a competitive neighbourhood constructed from master-slave pairs. These examples make the following assumptions;

A set of patterns is to be categorized, where each pattern is a normalized vector. Each vector has one or more elements corresponding to physical measurements; e.g. pixels within an image, each representing gray level intensities.

A requirement of the system is that the set of patterns be divided into p distinct categories, where p>1.

Each slave makes use of m internal pattern vectors, where m>1. (Note that for most applications, 2<=m<=8 is adequate).

Only the master-slave pair which best categorizes an input may learn that input; i.e. winner-take-all learning.

To the observer, each input should activate a single category which should be identified by a binary win/lose state.

An external learning control to enable and disable learning as desired by the user.

Additionally for the example shown in FIG. 2 and subsequently described in detail the additional assumptions are:

Use is made of a one dimensional neighbourhood connection topology based on the distance between master-slave pairs. Master-slave pairs are assumed to be equally spaced.

A requirement for limited guidance in the formation of categories, thus the inclusion of suggestive learning.

Figure 5:
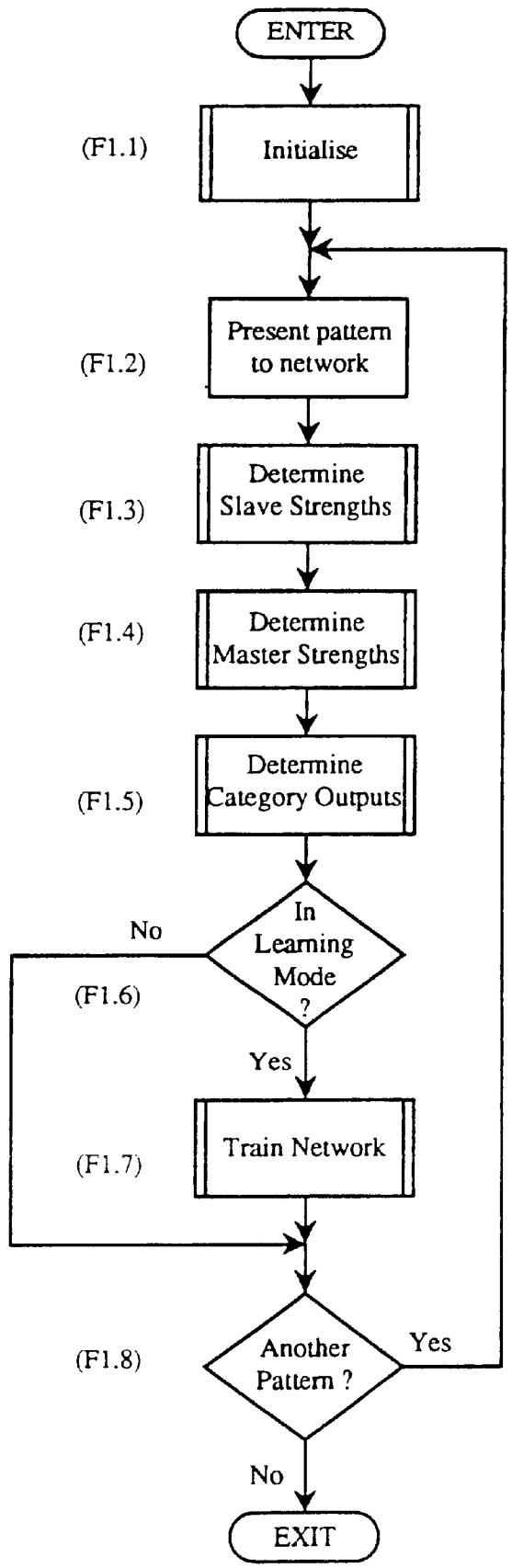
FIG. 5 shows a flow diagram setting out the main steps carried out by the system shown in FIGS. 1 and 2.

To train and use the neighbourhood, the procedure set out by the flow diagram in FIG. 5 is followed. Initialization (F1.1) sets all slave internal pattern vectors to be random unit vectors. All master and slave control parameters are set to suitable initial values that will be specified as these parameters are discussed.

Following the presentation of a normalized input vector to the input (F1.2), each slave determines a measure of category similarity, herein referred to as slave strength, based on the similarity between its internal pattern vector and the input (F1.3). The preferred implementation for this example is to allow the use of multiple internal pattern vectors.

Once calculated each slave sends its strength to every master. The master weights each of these inputs such that the desired topological connectivity is achieved. Each master calculates a master strength based on the weighted slave strengths and its activation. This master strength is then communicated to all other masters within the neighbourhood allowing the master with the greatest strength to be identified (F1.4).

As each input vector can be assigned to just one category, the master with the greatest strength identifies the category into which the input is assigned (F1.5). Provided learning is desired (F1.6), then the master with the greatest strength will instruct its slave to learn the current input vector (F1.7).

This process will be repeated until there are no further input vectors to be processed by the neighbourhood (F1.8).

Determine Slave Strengths

Figure 3:
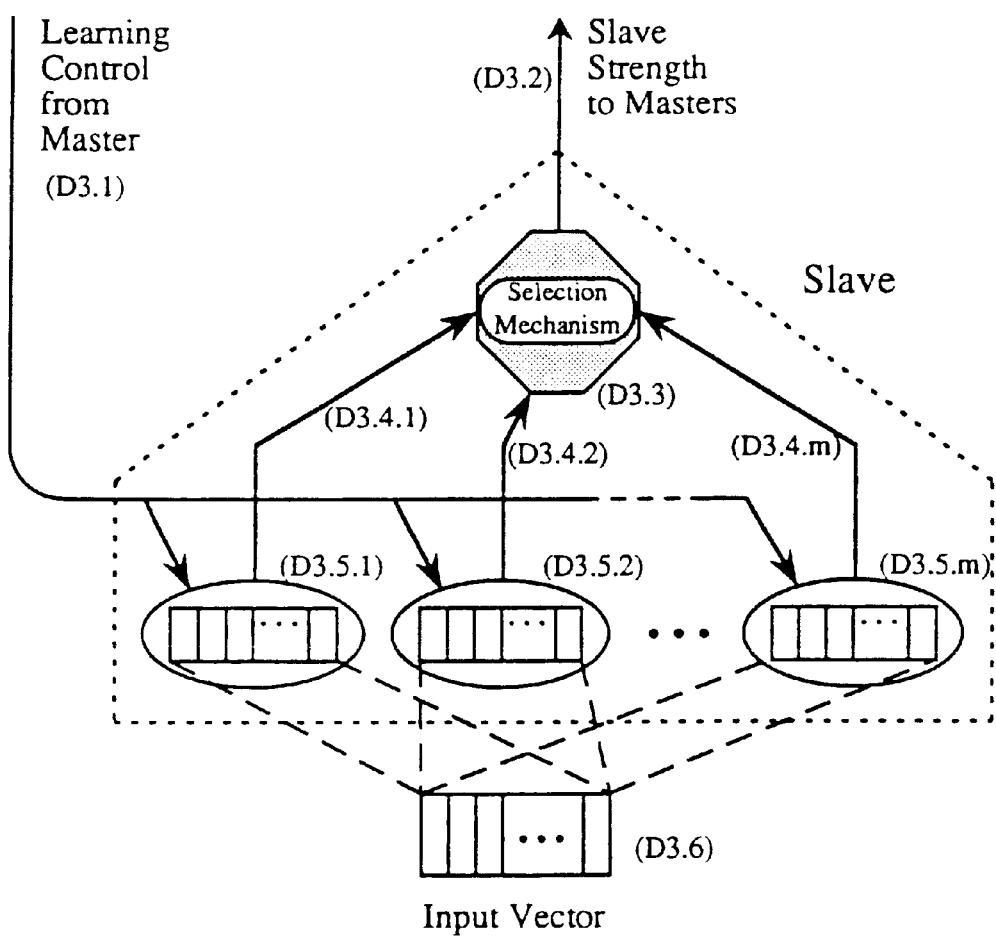
FIG. 3 shows a preferred implementation of the slave component in which the single reference pattern is replaced with multiple reference patterns.

The preferred implementation is to give each slave m internal pattern vectors, each with an attached importance value, where m>1. This preferred implementation of the slave is shown in FIG. 3. Herein the internal pattern vectors are denoted as $W_{ij}$ and their associated importance values by $\epsilon_{ij}$, where i is the index of the master-slave pair and j the index of the internal pattern vector. Following presentation of an input vector x to a slave (D3.6), a measure of similarity between that input and each internal pattern vector (D3.5.1 to D3.5.m) is calculated. These similarities together with their respective importance values are communicated (D3.4.1 to D3.4.m) to an appropriate selection mechanism (D3.3) used to obtain the slave strength, herein denoted as $S_i$ (D3.2).

For this example, the similarity metric, herein denoted by $\Gamma(x,w_{ij})$, is the vector dot product. The selection mechanism for determining the slave strength sets $S_i$ to be the maximum weighted internal pattern vector similarity, where the weighting is the internal pattern vector importance.

Figure 6:
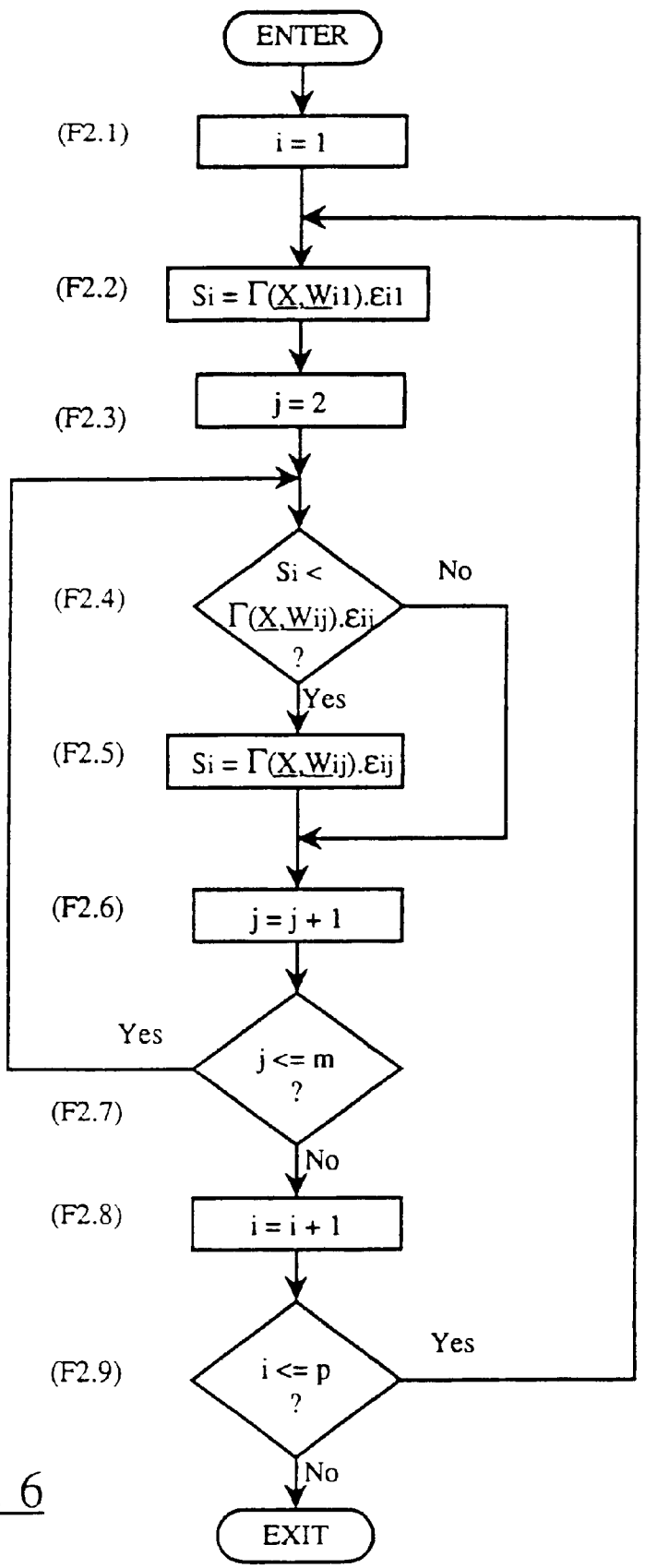
FIGS. 6 to 9 respectively show particular steps of the process of FIG. 5 in greater detail.

Given that all internal pattern vector importance values are initially set to $1/\sqrt{m}$, then the procedure for determining the strength of all slaves within the neighbourhood is outlined in FIG. 6.

In determining $S_i$, the weighted similarity of the first internal pattern vector is assigned direct to $S_i$ (F2.2).

Each additional internal pattern vector, $S_i$ is tested against the weighted internal pattern vector similarity (F2.4) and if the test evaluates true, $S_i$ is re-assigned such that it becomes equal to the new weighted similarity (F2.5). This process is repeated for all internal pattern vectors (F2.7), and for all slaves within the neighbourhood (F2.9).

Determine Master Strengths

Figure 4:
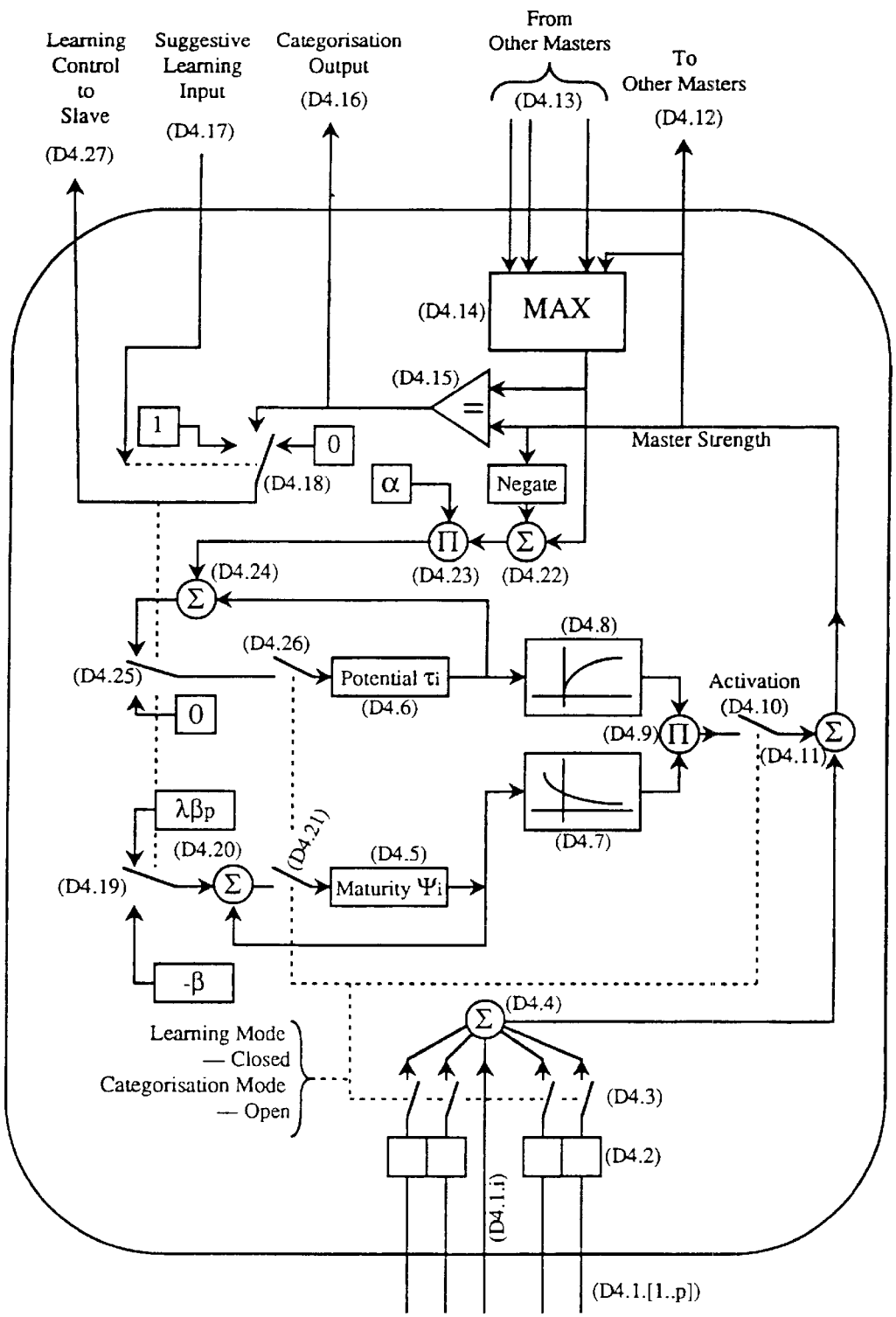
FIG. 4 shows in detail the preferred implementation of the master component of FIG. 2.

The preferred implementation of the master component is shown in FIG. 4. Each master receives an input from each slave (D4.1.1 to D4.1.1.p). Each of these inputs (other than the input from the masters own slave (D4.1.i)) is weighted (D4.2) to reflect the topological distance between master-slave pairs. For this example the distance between master-slave pairs i and k is $|i-k|$, where $1<=k<=p$. As the weighting is the inverse of distance, the input to master i from slave k is $S_k/(|i-k|+1)$. If learning is not required (Categorization Mode), the master ignores all slave inputs other than its own (D4.3).

Each master influences the learning of its slave with respect to all other slaves via two control values termed maturity (D4.5) and potential (D4.6). Maturity, herein defined as $\psi_i$, starts with a value of zero. Provided the master instructs its slave to learn a preselected fraction of input vectors presented to the network (during training), maturity will rise. If fewer than the preselected fraction of patterns are learnt, maturity will fall. Maturity tracks the long term utilization of the master-slave pair. Maturity is modified only when the system is in training mode (D4.21).

Potential, herein referred to as $\tau_i$, monitors short term utilization. Potential is initially set to zero. If during learning the slave is not instructed to learn, potential will rise at a rate that reflects the disparity between the strength of the category and the winning category. On instructing its slave on learn, a master will set its potential to zero. Potential is modified only when the system is in training mode (D4.26).

From its maturity and potential, a master determines its activation. Activation is the product (D4.9) of a function of maturity (D4.7) and a function of potential (D4.8). For maturity a bounded monotonically decreasing function (D4.7) is used. For potential an unbounded monotonically increasing function with a monotonically decreasing gradient (D4.8) is used.

The strength of a master, herein denoted by $M_i$, is given by the sum (D4.11) of the sum of the weighted slave inputs (D4.4) and the activation (D4.10). If in categorization mode, activation will be zero (D4.10). Once calculated, each master transmits its strength to every other master (D4.12). On receipt of all master strengths (D4.13), the maximum strength is identified (D4.14).

Figure 7:
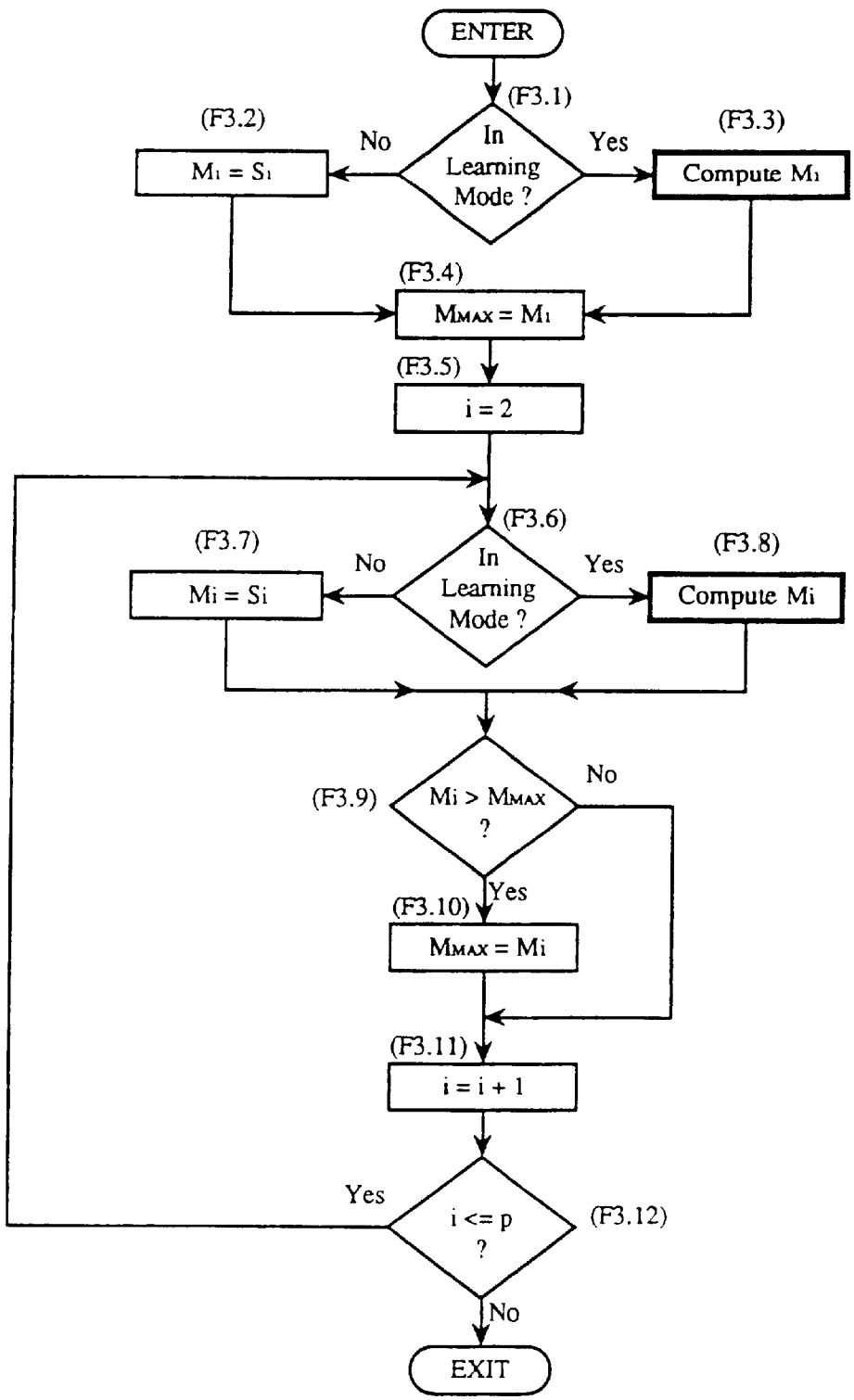
Figure 8:
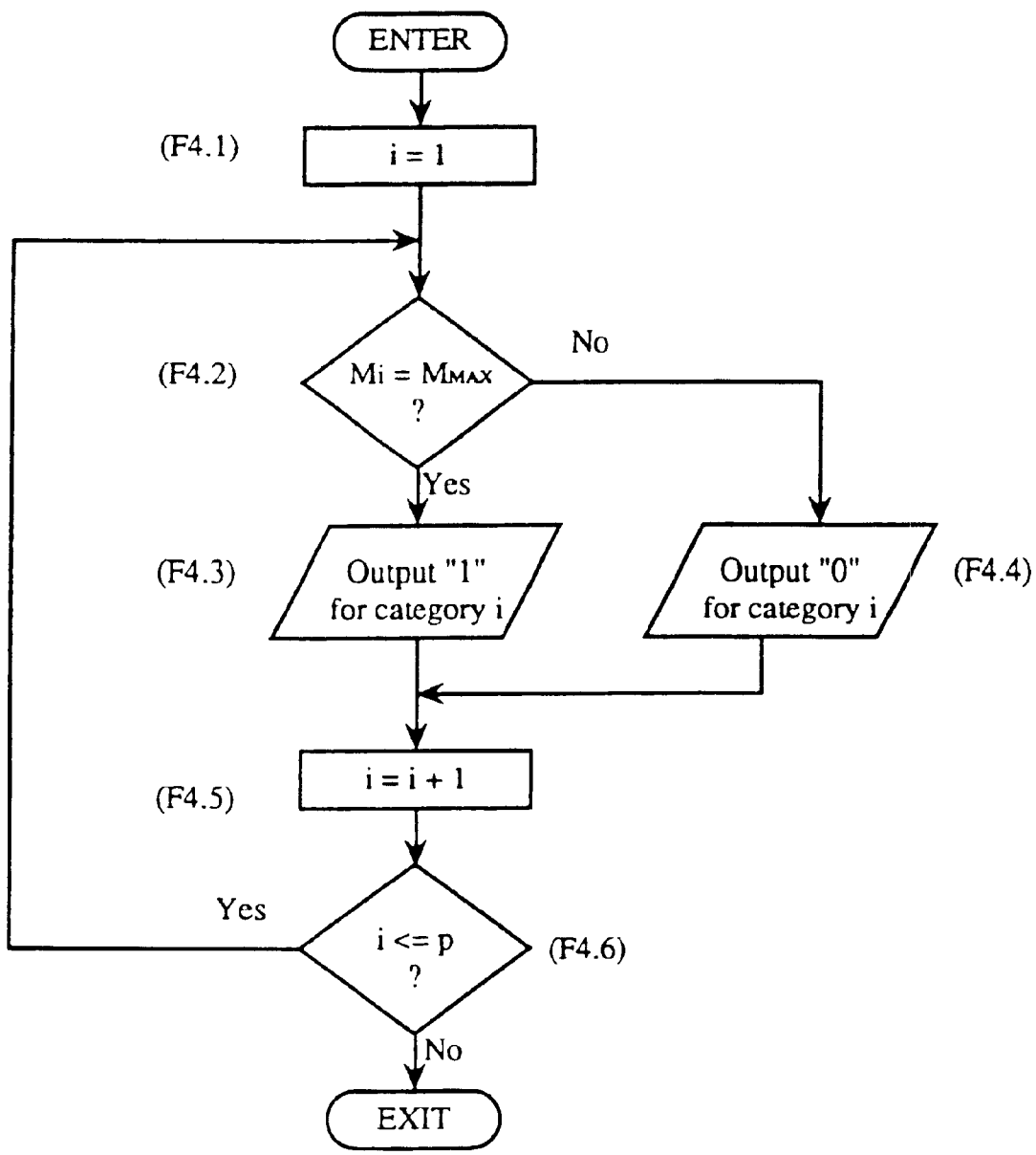

The procedure for calculating the strength of each master and thus the maximum strength is shown in the flow chart in FIG. 7.

If learning (F3.1) is required the strength of the first master $M_1$ is set by equation 1 (F3.3), otherwise $M_1=S_1$ (F3.2).

The maximum strength $M_{MAX}$ is set equal to the strength of the first master (F3.4). The strength of each subsequent master is calculated, such that if learning then $M_i$ is updated as given in equation 2 (F3.8), otherwise $M_i=S_i$ (F3.7). As each master strength is calculated, it is tested against $M_{MAX}$ (F3.9). If $M_i$ is the new maximum strength, $M_{MAX}$ is updated (F3.10). This is repeated for all masters (F3.12).

Determine Category Output

Each master has a binary win/lose output identifying the category to which an input is assigned (D4.16). The winner is the master that generates the greatest strength (D4.15). The procedure for determining the category output for each master is given in the flow chart shown in FIG. 8.

Each master tests its own strength against the maximum master strength (F4.2). If the strengths are equal the master outputs a binary "1" to identify itself as the winner (F4.4). Otherwise it outputs a binary "0" (F4.5). This process is repeated for all masters (F4.6).

Train Network.

Provided learning is required, each master on determining its internal win/lose state, will update its maturity and potential and will issue its slave with an appropriate training instruction. Unlike the category outputs, the internal win/lose states are influenced by the use of suggestive learning (D4.18). For this implementation, only one master may at any time be issued with a suggestive learning signal (D4.17). Thus the suggestive learning input to the neighbourhood, herein denoted by x, represents the index of the master to learn the current input.

Figure 9:
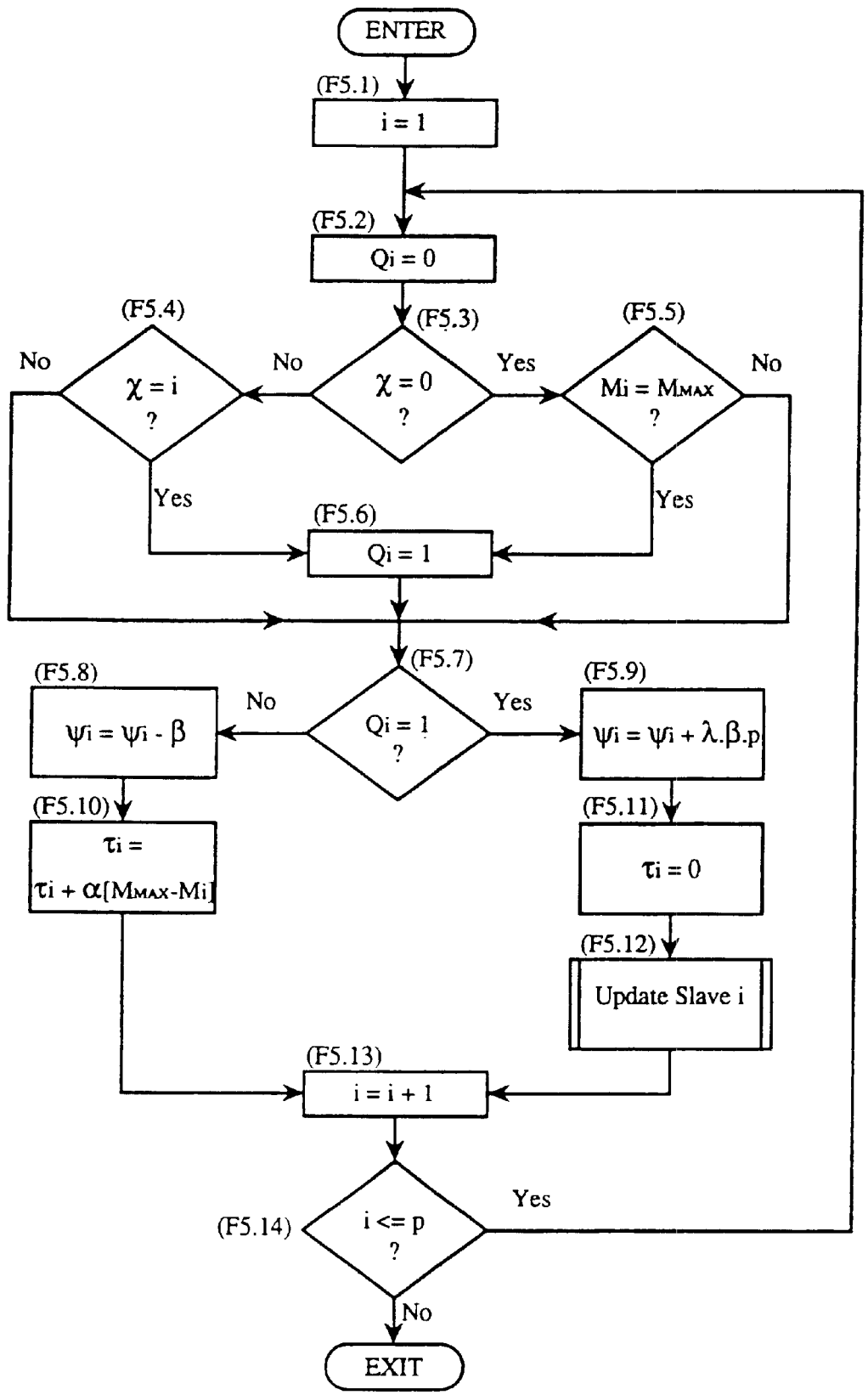

The procedure for determining the win/lose state, herein referred to as $Q_i$, for modifying maturity and potential, and for instructing a slave to learn is given in the flow chart shown in FIG. 9.

The win/lose state of each master is initially set to lose (F5.2). The suggestive learning input is then checked to determine if it is used (F5.3). If used, then if x corresponds to the current master (F5.4), $Q_i$ is set to indicate the win state (F5.6). If suggestive learning is not used, then if the master is generating the maximum strength (F5.5) $Q_i$ is set to indicate the win state (F5.6).

If a master is in the lose state (D4.19), its maturity is reduced (D4.20) by a constant $\beta$ (F5.8) where $\beta>0$. The value of $\beta$ determines the rate at which a neighbourhood matures. The value of potential is increased (D4.24) to reflect the additional strength required by the master to win (F5.10), (D4.22). The value of $\alpha$ (D4.23) is a constant that determines the rate at which potential can rise. For most applications $0<\alpha<1$.

If a master is in the win state (D4.19), its maturity is increased (D4.20) by $\lambda\beta p$ (F5.9). The value of $\lambda$ determines the level of equalization during learning where $1(\lambda p+1)$ is the minimum fraction of patterns that must be learnt if maturation is to occur. For most applications $\lambda=1$ is adequate. On winning (D4.25) a master sets its potential to zero (F5.11). Finally a signal is sent to its slave instructing it to learn the input vector (F5.12).

This process is repeated for all masters within the neighbourhood (F5.14).

Update Slave (i)

On receiving a learn signal from its master, a slave will update the internal pattern vector that most closely matches the input vector such that the similarity between the two is increased. The importance values attached to each internal pattern vector are then all updated to reflect the learning.

Figure 10:
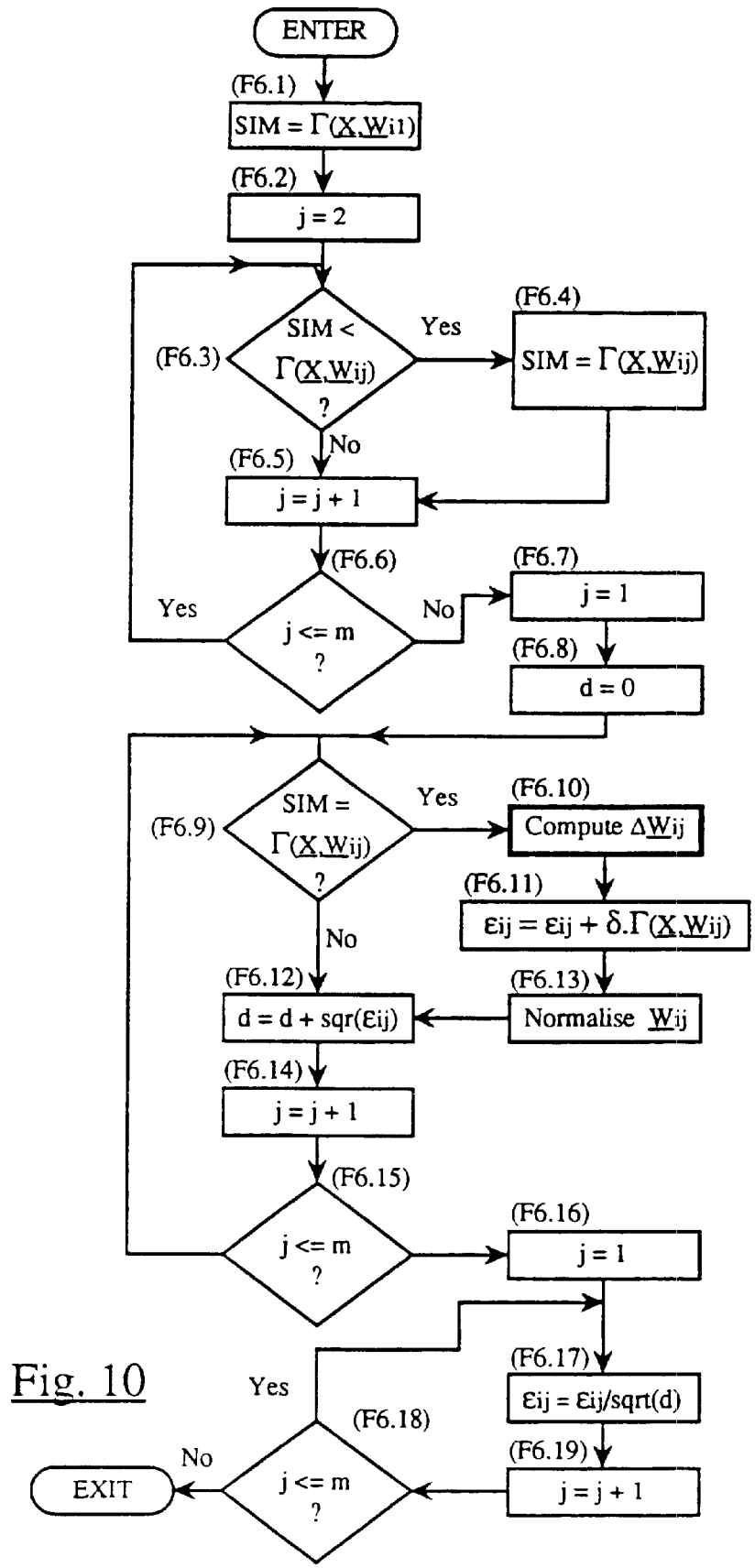
FIG. 10 shows a particular step of the FIG. 9 process in greater detail.

The procedure for training a single slave is shown by the flow chart in FIG. 10.

The internal pattern vector that best matches the input must first be identified. Using a temporary variable SIM, the similarity between the first internal pattern vector and the input is calculated and stored in SIM (F6.1). The similarity for each additional internal pattern vector is then determined and each checked against the value of SIM (F6.3). If greater that SIM (better similarity), SIM is updated to the greater similarity (F6.4). This is repeated for all internal pattern vectors (F6.6).

On identification of the internal pattern vector that has the greatest similarity with the input (F6.9), the internal pattern vector is updated such that the change $\Delta W_{ij}$ to $W_{ij}$ is given in equation 3 (F6.10) where $\zeta$ is a constant scaling factor. The importance value of the internal pattern vector is then increased to reflect the scale of the modification to its internal pattern vector (F6.11). Increase in importance value is proportional to the similarity between the input and internal pattern vector before modification.

The modified internal pattern vector is re-normalized to unity as required by the similarity metric (F6.13).

The importance values of the internal pattern vectors not modified are all decreased following learning. This is implemented by treating the importance values as elements of a vector that is normalized to unity. Step (F6.12) is used to calculate the length of the importance vector. Each importance value is then divided to keep the length at unity (F6.17).

Equations 1, 2 and 3 previously referred to are as follows:

$$M_1 = \exp(-\psi_1) \cdot \ln(\tau_1 + 1) + \sum_{k=1}^{P} \frac{S_k}{|1-k|+1} \quad (1)$$

$$M_i = \exp(-\psi_i) \cdot \ln(\tau_i + 1) + \sum_{k=1}^{P} \frac{S_k}{|i-k|+1} \quad (2)$$

$$\Delta \underline{w}_{ij} = \frac{(\varepsilon_{ij}+1)}{2} \cdot \text{MIN}[\exp(-\zeta \psi_i), 1] \cdot (\underline{x} - \underline{w}_{ij}) \quad (3)$$

What is claimed is:

1. A system for classifying data vectors into at least one of a plurality of categories respectively defined by stored vector representations which have been determined by a training process, the system comprising a plurality of interconnected processing elements which, for implementing the training process, include:

input means for receiving input training vectors;

storage means for storing vector representations of the categories;

calculating means for calculating a measure of similarity between an input vector and the stored representations for each category; and means for selecting stored vector representations and then modifying the selected stored vector representations so as to re-define the categories on an iterative basis during the training process;

wherein the selecting and modifying means comprises for the processing elements of each category:

means for recording a plurality of different measures of learning for the category based on previous modifications to the stored vector representation of that category with respect to the input vectors which have been received by the system;

means for combining said recorded measures of learning to form an activation value for the category;

means for evaluating a category strength value from said activation value and the respective measure of similarity; and means for receiving the category strength values from the processing elements of other categories in the system and deciding, based upon comparative category strengths, whether or not the selected category representation should be modified.

2. A system as claimed in claim 1, wherein the recorded measures of learning monitor long term category learning and short term category learning, the long term measure recording how frequently the category has previously had its stored vector representation modified, and the short term measure recording how recently the category has had its stored vector representation modified.

3. A system as claimed in claim 2, wherein the short term measure augments non-linearly with each unused input vector.

4. A system as claimed in claim 2 or claim 3, wherein the combination of said recorded measures is a product combination.

5. A system as claimed in claim 1, wherein the amount by which categories may be modified is local to each category and is based both on the maturity of the category and on the measure of similarity of the category.

6. A system as claimed in claim 5, wherein each category is represented by multiple reference vector representations each having an associated important value corresponding to the degree to which the representation can be regarded as typical of the overall category.

7. A system as claimed in claim 6, wherein each internal reference representation has a local training rate based upon its own importance value and upon the maturity of the category as a whole.

8. A system as claimed in claim 1, wherein the processing elements are arranged in a multi-layered arrangement and a suggestive learning input is provided to each category, the suggestive learning input being selectively operable by a user.

9. A method for training a classification system wherein each of the input vectors in a sequence of input training vectors is classified into at least one of a plurality of categories, respectively defined by stored vector representations, by comparing each input vector with the plurality of stored vector representations and selectively re-defining the categories by modifying at least some of the stored vector representations after the comparison and prior to comparison of the next input vector in the sequence, wherein in order to effect said modification of stored vector representation, the system (a) records a plurality of different measures of learning for each category based on previous modifications to the stored vector representation of that category with respect to the input vectors which have been received by the system;

(b) quantifies the similarity in the current comparison for each category;

(c) combines the measures from steps (a) and (b) into a strength factor for each category;

(d) correlates and compares the numerous strength factors for all the categories;

(e) identifies those categories having a strength factor which fall into a pre-determined class; and (f) modifies the categories identified by step (e).

* * * * *